May 8, 1928.
A. J. GRINDLE
1,669,084
POWDERED COAL DISTRIBUTION SYSTEM
Filed Jan. 26, 1921    7 Sheets-Sheet 2
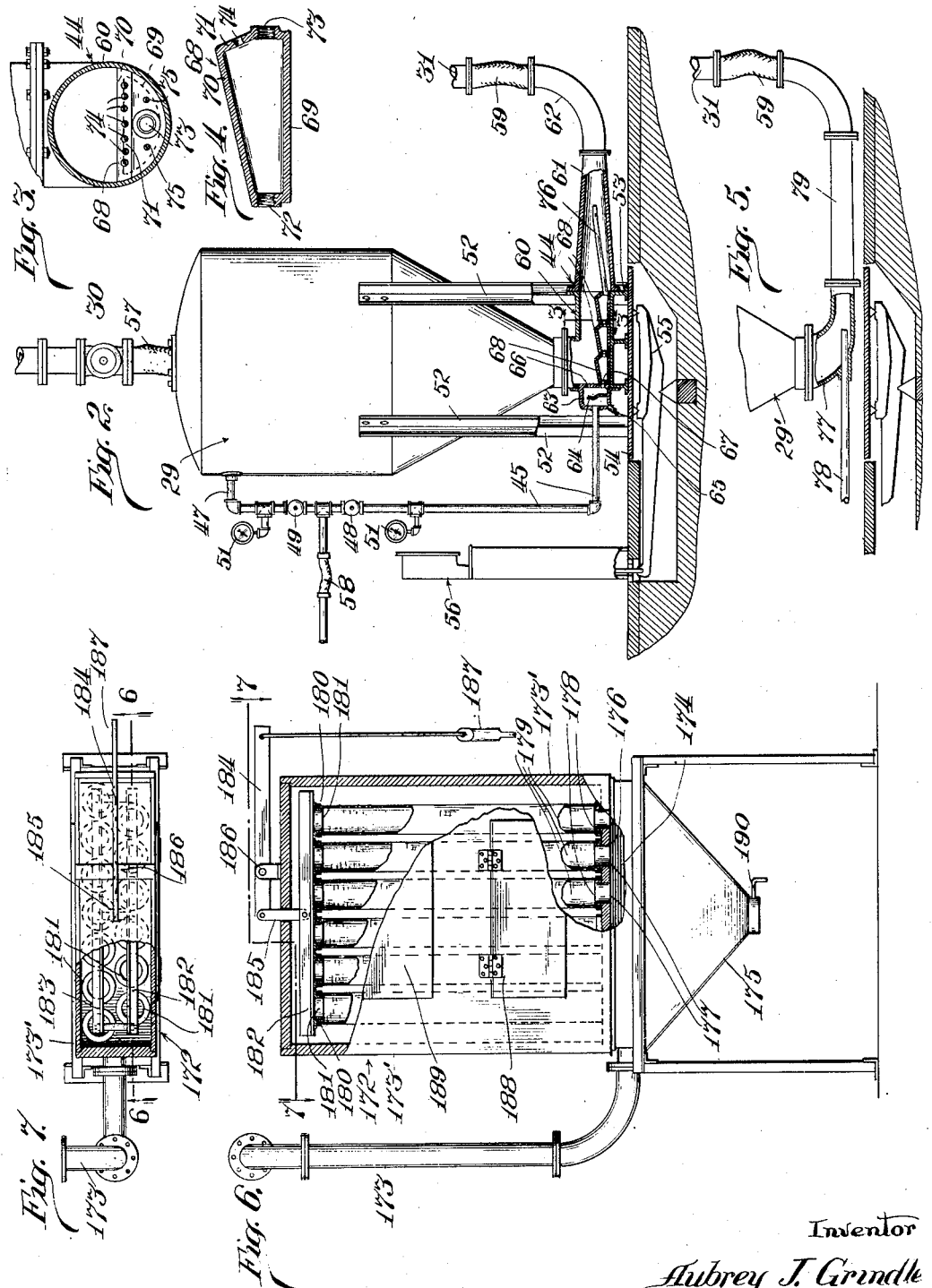
Inventor
Aubrey J. Grindle
By Gillson & Gillson
Attorneys.

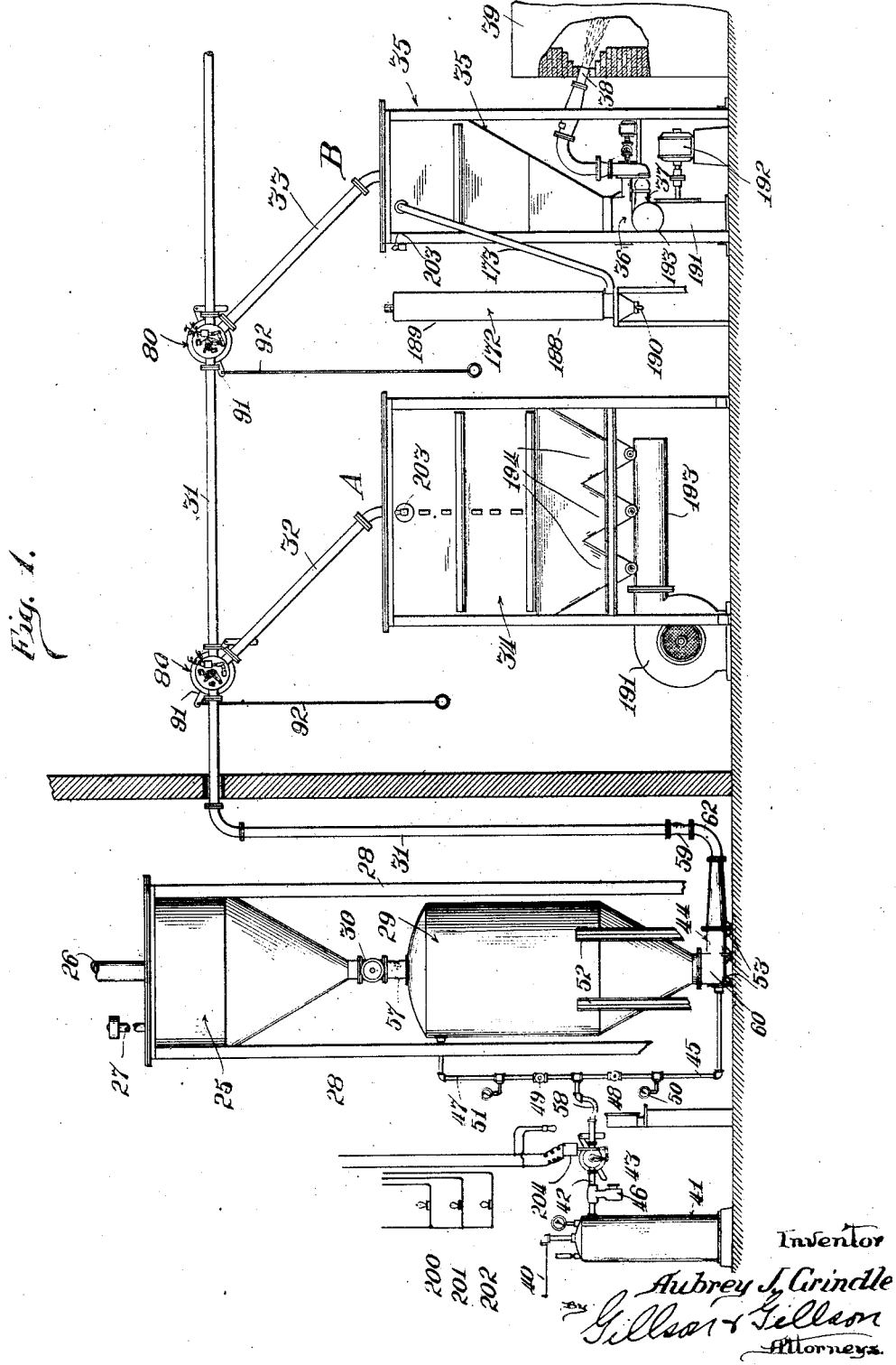

May 8, 1928.

A. J. GRINDLE 1,669,084

POWDERED COAL DISTRIBUTION SYSTEM

Filed Jan. 26, 1921 7 Sheets-Sheet 3

Inventor
Aubrey J. Grindle
By Gillson & Gillson
Attorneys.

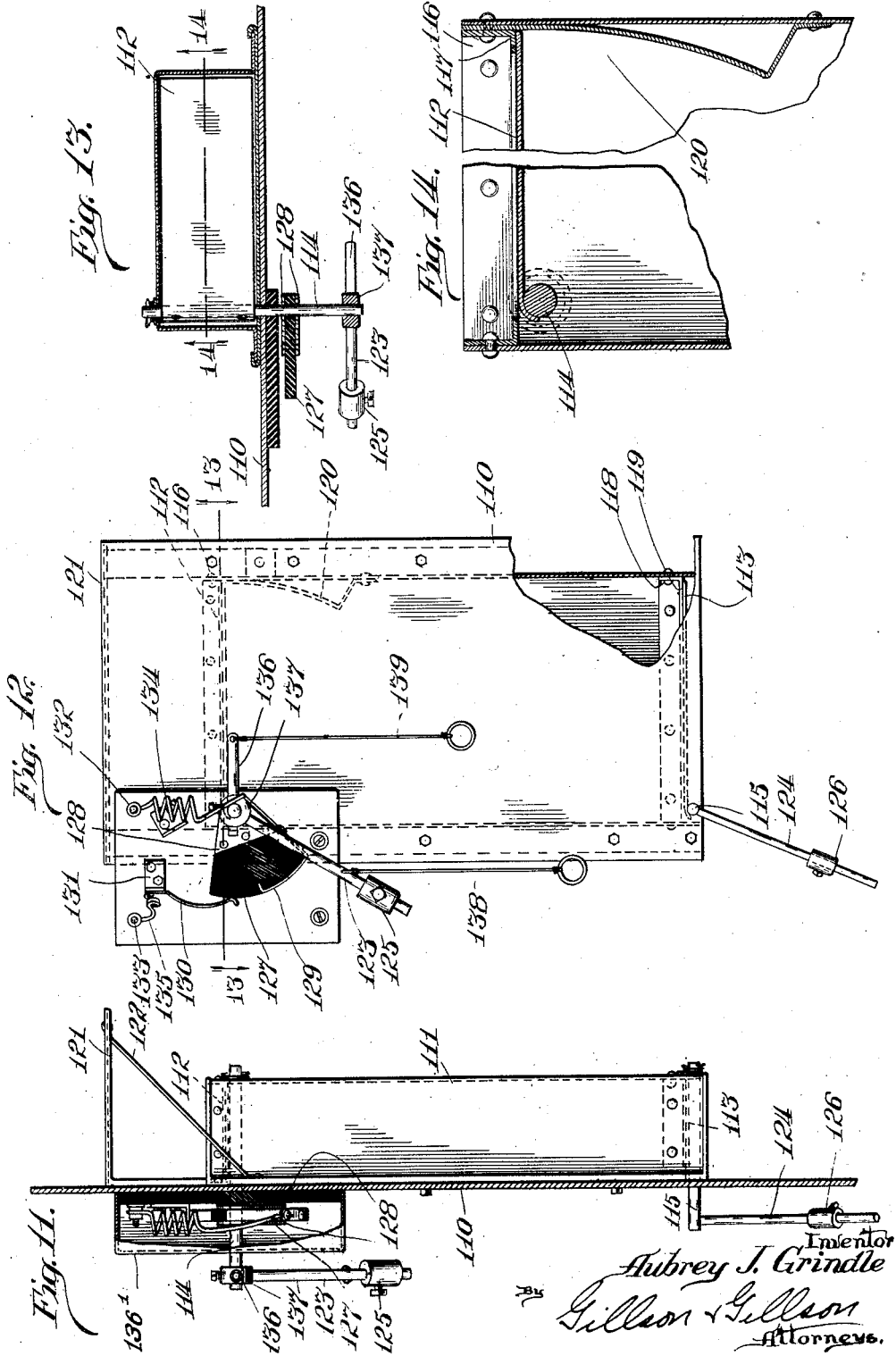

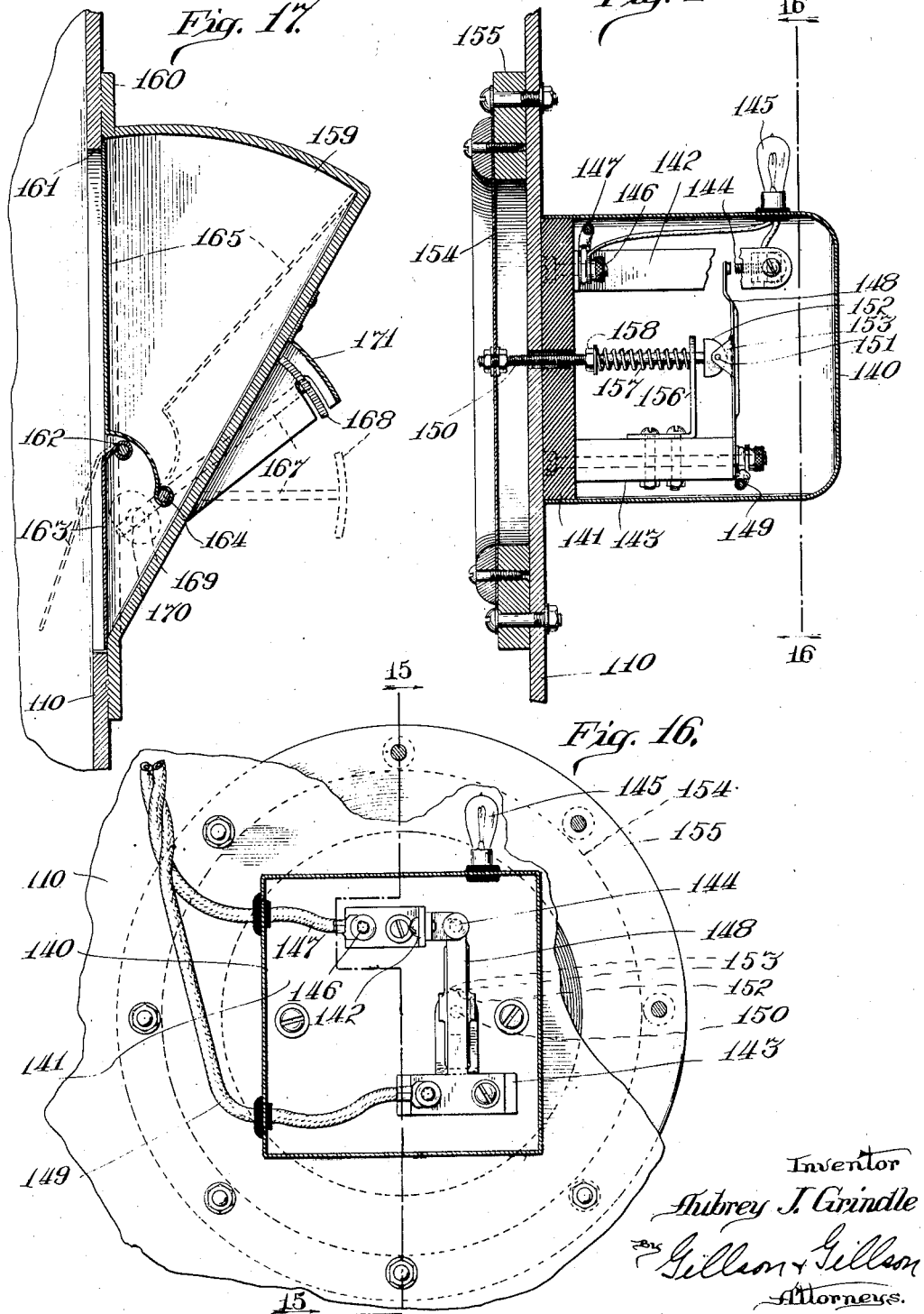

May 8, 1928.  1,669,084
A. J. GRINDLE
POWDERED COAL DISTRIBUTION SYSTEM
Filed Jan. 26, 1921   7 Sheets-Sheet 6
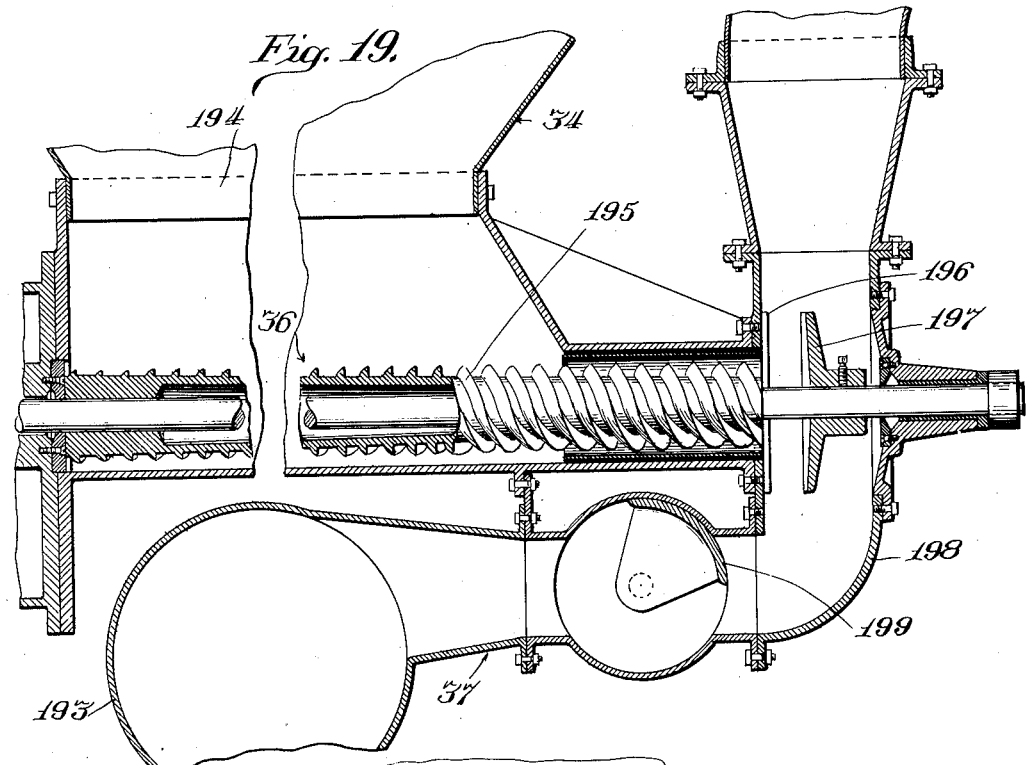
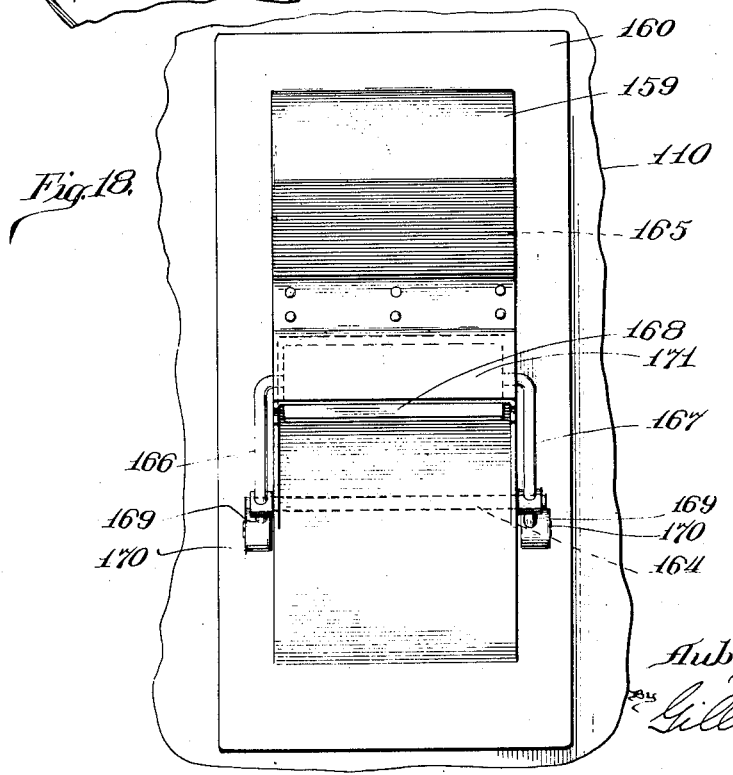
Inventor
Aubrey J. Grindle
Gillson & Gillson
Attorneys.

May 8, 1928.

A. J. GRINDLE 1,669,084

POWDERED COAL DISTRIBUTION SYSTEM

Filed Jan. 26, 1921   7 Sheets-Sheet 7

Fig. 20.

Inventor
Aubrey J. Grindle
By Gillson Gillson
Attorneys.

Patented May 8, 1928.

1,669,084

UNITED STATES PATENT OFFICE.

AUBREY J. GRINDLE, OF CHICAGO, ILLINOIS, ASSIGNOR TO GRINDLE FUEL EQUIPMENT COMPANY, A CORPORATION OF ILLINOIS.

POWDERED-COAL DISTRIBUTION SYSTEM.

Application filed January 26, 1921. Serial No. 440,007.

The invention relates to systems for delivering powdered coal from a central supply station to a plurality of consumption stations.

Among the objects of the invention are the provision of a storage bin and feed hopper at each consumption station having means to indicate the level of the fuel in the bin; of means at each consumption station to set a valve in fuel-receiving position and to thereby show a signal at the supply station indicating which consumption station is signaling for fuel, and also a signal at each consumption station, including the signaling station, indicating that fuel is being signaled for or is being supplied; of means at each consumption station to automatically terminate the delivery of fuel to that station when the fuel reaches a predetermined level in the feed hopper, and also means at each station to at will terminate the delivery of fuel to that station; of means actuated upon the operation of either of said terminating means to cut off the supply of fuel-carrying air at the central station; of means at the central supply station to ascertain the weight of fuel delivered to each consumption station; of means to deliver a supply of fuel and air into a supply conduit in an effective manner to insure free movement of the fuel; and of means to indicate the level of fuel in the storage bins.

An illustrative embodiment of the invention is shown in the accompanying drawings, in which Fig. 1 is a general view in elevation of a system comprising a supply station and two consumption stations;

Fig. 2 is a side view, partly in central vertical section, of a supply hopper and scales on which the supply hopper is supported;

Fig. 3 is a detail section on line 3—3 of Fig. 2;

Fig. 4 is a vertical longitudinal section through an air jet casting;

Fig. 5 is a detail side view, partly in section, of a modification of the form of supply feed illustrated in Fig. 2;

Fig. 6 is a side elevation of a dust collector, with parts broken away to show the interior structure in section;

Fig. 7 is a plan view, partly in horizontal section, on line 7—7 of Fig. 6;

Fig. 11 is a side view of a coal level operated circuit closer showing a wall of a feed hopper in section;

Fig. 12 is a detail elevation of a portion of a wall of a feed hopper showing the switch of the circuit closer of Fig. 11 in elevation and with the wall of the feed hopper partly broken away to show details of the circuit closer in section;

Fig. 13 is a horizontal section on line 13—13 of Fig. 12;

Fig. 14 is a detail section on an enlarged scale, with a portion omitted, taken on line 14—14 of Fig. 13;

Fig. 15 is a vertical longitudinal section on line 15—15 of Fig. 16, showing details of a preferred form of fuel level indicator;

Fig. 16 is a vertical transverse section on line 16—16 of Fig. 15, with a portion of the wall of a feed hopper shown;

Fig. 17 is a vertical longitudinal section of a modified form of fuel level indicator;

Fig. 18 is a front view of the form of indicator shown in Fig. 17;

Fig. 19 is a detail vertical section through one of the burner-feeding mechanisms shown generally in Fig. 1; and Fig. 20 is a diagram of circuits.

Figure 8:
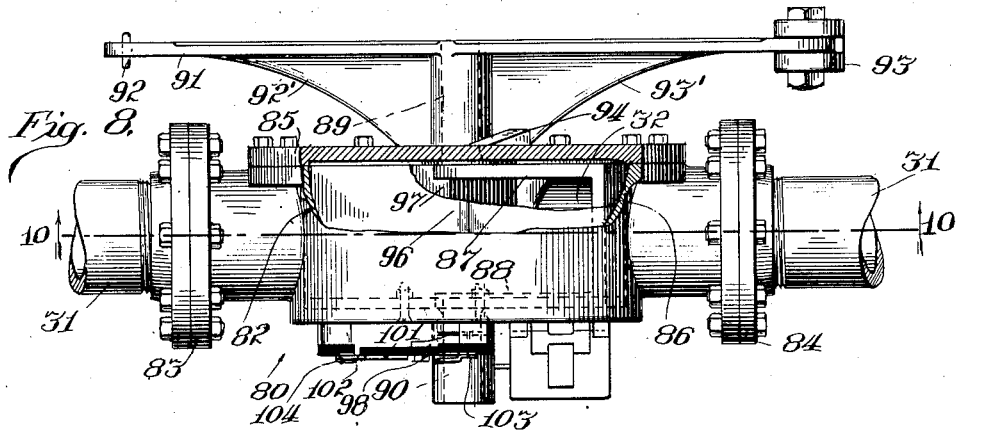
Fig. 8 is a detail plan of one of the fuel delivery valves shown in Fig. 1.

The powdered coal to be used in the system is supplied to the main storage hopper 25 through the conduit 26 from a source not shown. The air may escape from the hopper, as the fuel enters, through the pipe 27. The hopper 25 is supported from the floor independently on legs 28. From the hopper 25 the fuel is allowed to flow into the supply hopper 29 under the control of a valve 30. From the hopper 29 the fuel is carried by an air blast through a conduit 31, and is delivered through branch conduits 32, 33, of any desired number, two only being shown, to storage bins and feed hoppers 34, 35. From the feed hoppers the fuel is discharged by means of feeding mechanism 36, 37, to burners, one of which is indicated at 38 as applied to a metallurgical furnace 39.

Air for the transporting blast in the main conduit 31 is supplied by a compressor, not shown, through a pipe 40 and stored in a tank 41, from whence it is drawn as wanted through a pipe 42, under control of a valve 43, and delivered to the supply feed device 44 through pipe 45. To separate any moisture which may be contained in the air, from the air, an air separator 46, of well known form, may be connected in the pipe 42. To facilitate the discharge of fuel from the hopper 29, air under pressure may be admitted into the hopper above the fuel through the pipe 47. Valves 48, 49, may be provided to determine the relative volumes of air permitted to flow through pipes 45 and 47, and pressure gages 50, 51, may be supplied to show the pressure existing in each pipe.

To enable the operator to determine how much fuel is delivered to each storage bin 34, 35, etc., the legs 52 and the feet 53 which support the hopper 29 may be placed upon the platform 54 of a set of scales 55 (see Fig. 2), having a beam conveniently placed in a housing 56 for indicating the weight. To prevent the pipe connections to the hopper from interfering with the correct weighing of the hopper and contents, a flexible connection, as 57, 58, 59, is provided in each pipe or conduit. A supply of fuel may be admitted to the hopper 29, the valve 30 may be closed, and the hopper and fuel may be weighed. The desired quantity may then be delivered to any consumption station, and the hopper and remaining fuel may be again weighed. The difference in the two weights may be recorded as the amount delivered.

To deliver fuel in suspension in a blast of air to conduit 31, the injector device illustrated in Fig. 2 may be utilized. As there shown the feeding device 44 comprises an elbow section 60, adapted to receive fuel from the hopper, and a reducing section or nozzle 61 connected to the conduit 31 by means of an elbow 62 and the flexible connection 59. A motive fluid intake chamber 63 is shown superposed on the end of the elbow 60, to which air under pressure is admitted from pipe 45. To remove any free moisture that may be in the air a baffle plate 64 is placed in the chamber, against which the entering air impinges and upon which any drops of moisture will be deposited. A pet cock 65 is provided to draw off collected moisture. An opening 66, leading directly into the interior of the elbow 60, and a second opening 67, leading into the first of a series of air jet castings, are provided as outlets for the chamber 63.

A plurality of air jet castings 68 are provided, three being shown, the details of the construction of which are more clearly shown in Figs. 3 and 4. As there shown each casting 68 comprises a lower wall 69, curved to fit the interior of the elbow 60, an upper plane wall 70 sloping upwardly in the direction of air travel, and an end wall having a portion 71 sloping abruptly downward in the direction of air travel and having jet holes therein. Interiorly threaded openings 72 and 73 are provided in the ends of the castings 68. Successive castings may be connected together by means of a short nipple screwed into these openings, if desired.

The sloping wall 71 of the first casting 68 preferably is provided with three jet holes 74, as shown in full lines in Fig. 3; the second with four jet holes, as shown in dotted lines in the same figure; and the third, when three are used, with the four holes in the sloping wall 71, and also with two jet holes 75 adjacent the lower wall 69, as shown in dotted lines in Fig. 3. The last of the castings 68 of the series may have a pipe 76 screwed into its hole 73, and projecting into the reducer 61, discharging near the axis thereof. This being the largest opening of all the discharge openings, will deliver the greatest volume of air, and will have an injector action to aspirate the fuel which has been agitated and started by the air emitting from the jet holes 66, 74 and 75.

By thus distributing the ports through which incoming compressed air or other motive fluid is delivered along the length of the interior of the injector, packing of powdered material in the injector is prevented and uniform, continuous delivery of material to pipe 31 is assured, this particularly when air or other motive fluid is also continuously applied through pipe 47 to the top of powdered material in tank 29. By placing the injector below tank 29, gravity assists in producing this desired continuous flow of delivered fuel material.

For smaller installations where the volume of fuel to be handled is not so great, the simpler form of supply feed shown in Fig. 5 may be utilized. In this form the elbow 77, receiving fuel from the hopper 29, has an air supply pipe 78 projecting thereinto in alignment with the lower portion of section 79 of the conduit 31.

A hopper, as 34, 35, is placed at each consumption station for the purpose of receiving and storing a supply sufficient for use during a considerable length of time, to avoid the serious results which might occur through failure of fuel during a heating operation. To cause fuel to be delivered to any hopper 34, 35, from the conduit 31 at will, a valve 80, is placed in the conduit 31 adjacent each hopper, which valve is adapted to direct the fuel into a branch circuit, as 32, 33, leading to the corresponding hopper 34, 35.

Figure 9:
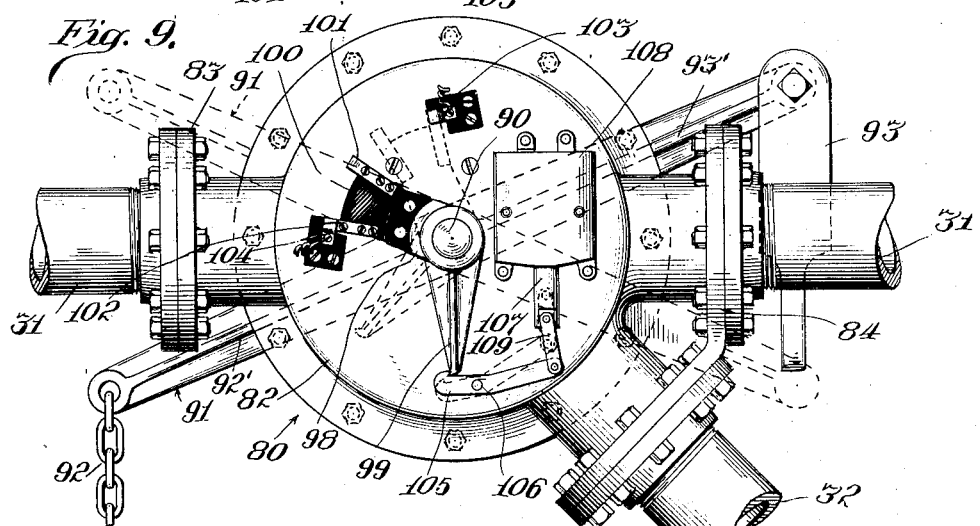
Fig. 9 is a side elevation of the valve shown in Fig. 8.
Figure 10:
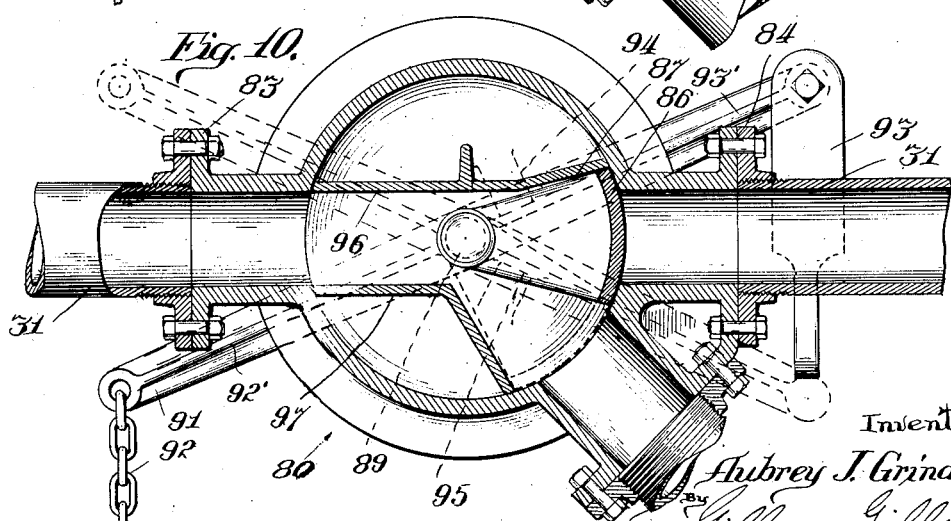
Fig. 10 is a central vertical section on line 10—10 of Fig. 8, showing the valve shifted to cause fuel to be delivered to the station at which the valve is located.

The structure of valves 80, may be alike, and, as shown more in detail in Figs. 8, 9 and 10. As there shown the valve comprises a casing 82, having connecting flanges 83, 84, for connection of conduits 31 and 32, a cover plate 85, and a valve gate. The valve gate has a port-controlling member 86, forming a section of a cylinder, with a sector-shaped plate 87, 88, projecting from each of its ends, and each plate 87, 88, carrying a stub shaft 89, 90, upon which the gate swings, the stub shafts being journaled in the cover plate and in the casing respectively. For operation of the valve an arm 91 is secured to the stub shaft 89, and has a pull chain 92 secured to one end, and a weight 93 attached to the other end to hold the valve normally in a position in which the passage through conduit 31 is open. The arm 91 is shown as reinforced with flanges 92', 93'. Stops 94, 95, may be provided on the cover plate 85 to limit the movement of the arm 91 in either direction. The space within the casing 82 is preferably blocked off by partitions 96, 97, to limit the access of the powdered fuel to the desired path for its travel.

For automatic control of the valve and of a signal, to be explained, the stub shaft 90 is shown as equipped with a pair of arms 98 and 99. The arm 98 has a block of insulating material 100, secured thereto, and upon the insulating material two contacts 101, 102, coacting with contacts 103, 104, when the valve is in normal and in fuel-receiving positions, respectively. The arm 99 is adapted to coact with a catch 105, which is pivoted at 106, and the other end of which is connected to the core 107 of a solenoid 108, through the medium of link 109. When the chain 92 is pulled the valve will be shifted to fuel-taking position, the arm 99 will be caught by catch 105, and contacts 101 and 103 will be separated and contacts 102 and 104 will be closed. When the solenoid 108 is energized the arm 99 will be released, and the influence of weight 93 will return the valve to its normal position, reversing the position of the contacts.

A preferred form of fuel level circuit closer which may be utilized to energize the solenoid 108 when the desired amount of fuel has been delivered to a hopper 34 or 35, is shown in Figs. 11, 12, 13 and 14. A portion of the wall of the hopper is shown at 110. The device is to be secured to the wall on the interior of the hopper, and comprises a box-like casing 111, having trap doors 112 and 113 at its top and bottom, respectively, which doors are pivoted upon shafts 114 and 115 projecting through the wall 110 of the hopper to the exterior. An angle iron 116, having a horizontal inwardly extending flange, is secured to the inside of the upper end of casing 111, and a like angle iron 118, with a flange 119 in the lower end of the casing. When the doors 112 and 113 are closed they abut against the lower sides of flanges 117 and 119, respectively.

To prevent the passage of fuel lying on top of the door 112 before the door has moved a certain minimum distance, a curved plate 120 is secured to the inside of the casing 111 in such a position as to lie closely adjacent to the path of travel of the edge of the door 112 as it opens. To prevent fuel falling into the casing 111 as it is delivered to the hopper, a shield 121, supplied with proper bracing 122, is placed above the top of the casing. To keep the doors 112 and 113 normally closed, each shaft 114 and 115 is provided with a weighted arm 123 and 124, each arm carrying a weight 125, 126.

A sector-shaped block 127 of insulating material, secured between a pair of plates 128, is secured to the shaft 114 and has fixed upon a portion of its edge a metallic contact member 129. A second contact member 130, carried by a block 131 of insulating material, is positioned to make contact with the edge of the sector-shaped block 127 when the door 112 is closed, and to contact with the contact member 139 when the door opens. The block 131 is secured to the exterior of the wall of the hopper, and carries binding posts 132 and 133, which are connected to contacts 129 and 130 by means of wires 134 and 135 respectively. A cover 136', shown in Fig. 11, may be placed over the contacts, if desired.

When the level of fuel in the hopper 34 or 35 is below the range of movement of the edge of the door 113, any fuel which has found access to the interior of the casing 111 will, by its weight on door 113, overbalance weight 126 and be discharged, leaving the casing empty, the door 113 automatically closing. Fuel subsequently delivered to the hopper by conduit 32 or 33 cannot fall into the top of the casing 111 because of shield 121. However, when the hopper becomes nearly full the fuel will slide into the casing, the angle between the outer edge of the shield 121 and the outer edge of the top of the casing 111 being less than the angle of repose of the material. The fuel thus received by door 112 will overbalance the weight 125 and open the door, bringing contacts 129 and 130 together, thus energizing solenoid 108 by connections to be described and shifting the valve 78 to stop delivery of fuel to the hopper. To enable an attendant to agitate the door 112 in case it becomes stuck or the fuel does not slide completely off from it, an arm 136 is provided upon the hub 137, in addition to the arm 123. Chains 138, 139, are secured to the arms 123 and 136, respectively, which may be alternately pulled upon by the attendant.

Two forms of devices are shown in Figs. 15 and 16, and in Figs. 17 and 18, for indicating the level of fuel in the hopper 34 or 35. In the preferred form of Figs. 15 and 16 the device comprises a casing 140, having a base 141 secured to the exterior of the wall 110 of the hopper. Two posts 142 and 143, of insulating material, are shown rising from the base 141. The post 142 carries a stationary contact 144. A signal lamp 145 is shown connected to contact 144 and to a binding post 146, to which binding post one line wire 147 of a local circuit is also connected. The other post 143 carries a movable contact 148, which contact is connected to the other line wire 149 of the local circuit.

The movable contact 148 is operated by means of a rod 150, connected to the contact by a pin 151 passing through the head 152 of the rod, and through downwardly turned ears 153, being part of the material of the contact member 148. For its operation the rod 150 is connected to the center of a flexible diaphragm 154 mounted on a ring 155 secured to the interior of the wall 110 of the hopper. The rod 150 projects through holes in the wall 110 and in the base 141, and is guided in its movement by a bracket 156, mounted upon the post 143. The contacts 144 and 148 are kept normally separated by the resilience of diaphragm 154, assisted by a spring 157 surrounding the the rod 150, and acting in compression between bracket 156 and a nut 158 threaded upon the rod. A plurality of the casings 140 are placed at different levels on the hopper, and the lights will show which of them have fuel against their diaphragms, thus indicating roughly the level of the fuel in the hopper.

In the modified form illustrated in Figs. 17 and 18, the level indicator is shown as a purely mechanical device, comprising a casing 159 having a flange 160 secured to the exterior of the wall 110 of the hopper, covering an opening 161 in the wall. A shaft 162, journaled in the sector-shaped side walls of the casing 159, bears a shield 163, which opens toward the interior of the hopper, as shown in dotted lines in Fig. 17, which shield is adapted to prevent entry of the fuel to the casing so as to interfere with the action of the signal.

A second shaft 164, journaled in the sides of the casing 159, carries a plate 165 adapted to swing into the casing at its top when fuel lies against it, as shown in dotted lines in Fig. 17. The plate 165 is shown as curved inwardly of the casing and downwardly, so that shaft 164 lies at a lower level and in the rear of the shaft 162. The portions 166 and 167 of the shaft 164 exterior of the sides of the casing are bent at right angles to the shaft, and the target 168 is attached to the ends thereof. To restore the target when no fuel is against the plate 165, an arm 169 is secured to the shaft 164 exterior of the casing, and a weight 170 is attached to the end of the arm.

As with the form of indicator of Figs. 15 and 16, a plurality of mechanical indicators may be placed at different levels on a hopper. When the fuel level in the hopper falls below any indicator, the fuel that has gained access to the rear of the shield 163 will flow out of the casing, the shield swinging freely into the hopper to permit the action. This can not take place until the fuel in the hopper has cleared the lower end of the shield 163, and up to that time the fuel will be banked against the curved portion of the plate 165 and the target will be displayed. When the fuel discharges from the casing the plate 165 and the target 168 will be returned to the full lines position of Fig. 17. When the level of fuel again rises in the hopper, none can get into the casing until the level has risen sufficiently to press the plate 165 to the rear, when the target 168 will be displayed, giving an indication of the level of the fuel. A shield 171 may be provided to conceal the target when in nonindicating position.

The air which carries fuel to the hoppers 34, 35, must be allowed to escape. To permit of such escape without loss of fuel a dust collector 172, shown in detail in Figs. 7 and 8, may be positioned adjacent each hopper, and a conduit 173 may be connected adjacent the top of the hopper and to the bottom of the dust collector. The dust collector is shown as comprising a rectangular casing 173′, having an air-receiving chamber 174 at its bottom, and a collecting hopper 175 below the chamber. The top of the air chamber 174 is formed by a partition 176, having a plurality of openings 177 each surrounded by an upstanding flange 178. Each of a plurality of fabric tubes 179 is secured at its bottom to one of the flanges 178, and at its top to a flange 180 carried by separate disks 181. The disks 181 are each riveted to one of the angle irons 182, 183, which are both suspended from the end of a lever 184 by means of a link 185 extending through the top of the casing. The lever 184 is pivoted at 186, and the tubes are kept taut by a counterweight 187.

Doors 188 and 189 are hinged to swing outwardly at their bottoms to allow free escape of air from the casing 172 exterior of the tubes 179, and at the same time prevent entrance of sparks. The air escaping from the hopper 34 or 35 through conduit 173 will enter the air chamber 174, and, due to the great difference between the area of cross-section of conduit 173 and the combined cross-sectional area of openings 177, will have the speed of its travel very greatly reduced. This reduction of speed will result in the falling from suspension, in the air of a large part of the dust. Practically all of the remainder will be detained by the fabric of the tubes 179, as the air escapes through them. At intervals the attendant will lift the weight 187, thus slackening the tubes 179, and then pull forcibly downward on the weight bringing the walls of the tubes taut with a jerk. This will effectually shake off the dust, which will be collected by hopper 175, and may be discharged by manipulation of the gate handle 190.

The means for feeding the fuel from the bottom of hoppers 34 and 35 may be that shown in my copending application Serial No. 314,136, filed July 29, 1919, Patent No. 1,457,521, and shown in Fig. 19 herein. As indicated in connection with hopper 34 in Fig. 1, a plurality of burners may be fed from each hopper, a common fan 191, directly connected to an electric motor 192, supplying air for the group through a conduit 193.

Under these circumstances each of the discharge portions 194 of the hopper will be provided with a feed screw 195 discharging between fixed and movable plates 196, 197, into conduit 198, in which air under control of valve 199 conveys the fuel to the burner 38 directed into the furnace 39.

A series of signal lamps 200, 201, and 202, one for each station, is shown located at the central supply station, and a signal light 203 at each consumption station. The valve 43 is preferably of the type of valves 80, and controlled by a solenoid 204, in the same manner as are the valves 80 by the solenoids 108.

A diagram of the circuits for the system, with the exception of the local lamp circuit of the electric fuel level indicators, is shown in Fig. 20. As there illustrated the lamp 200 is connected by wire 205 to contact 102 at station A, lamp 201 by wire 206 to contact 102 at station B, and lamp 202 by wire 207 to contact 102 at station C. Contacts 104 at stations A and B are connected to line wire 211 by wires 209 and 210, respectively, and line wire 211 is connected directly to contact 104 at the most remote station, station C as shown in Fig. 20. Wire 212, which is common to lamps 200, 201 and 202, has connected therein, in series, a signal lamp 203 at each station, as A, B and C, after which it is connected to a line wire 208 at the most remote consumption station, station C as shown in Fig. 20.

Solenoid 108 at station A is connected to wire 205 by wire 213, and to contact 129 at that station by wire 214. Solenoid 108 at station B is connected to wire 206 by wire 215, and to contact 129 at that station by wire 216. Solenoid 108 at station C is connected to wire 207 by wire 217, and to contact 129 at that station by wire 218. Contact 130 at station A is connected to line wire 211 by wire 219, at station B by wire 221, and at station C is connected directly thereto. Contacts 101 and 104 at station C, or the most remote station, are permanently connected. A circuit closer 222 is bridged about contacts 129 and 130 at each station.

Solenoid 204 is connected by wire 223 to a contact 224, carried by the arm 225, by which the valve 43 is controlled, which contact is adapted to close with stationary contact 226 when the valve is set to admit air to hopper 29, and to the feeding mechanism 44. Contact 226 is connected by wire 227 to line wire 208. The other binding post of solenoid 204 is connected to contact 101 at station A by wire 228. Contact 103 at station A is connected to contact 101 of station B by wire 229. Contact 103 at station B is connected to contact 103 at station C by wire 230. Contacts 101 and 103 at the successive stations are thus connected in series until the most remote station is reached, at which, as at station C, contact 101 is connected to contact 104 by wire 231.

The operation of the system is as follows:—The attendant at the central station will have a supply of fuel ready in the hopper 29, the valve 30 will be closed and the hopper 29 weighed. The attendants at the consumption stations will have instructions not to manipulate the valve 80 at their station at any time when the signal lamp 203 is lighted at their station. Assume that the attendant at station B is about to start an operation requiring a supply of fuel greater than the level indicators 145 or 168 on the hopper 35 show is present in the hopper, and that his light 203 is out. He will pull the chain 92 attached to the arm of this valve 80, thus setting the gate of the valve to close the conduit 31 beyond his station and open the conduit 33 leading to hopper 35.

This action will separate contacts 101 and 103 and close contacts 102 and 104. A path for current will thus be closed from line wire 211 at station B through wire 210, contacts 104, 102, wire 206, lamp 201 at the central station, wire 212 through the lamp 203 at each station in the system to line wire 208 at the last station, station C. The lamps will warn each of the other consumption stations that conduit 31 has been taken for use by some station, will show the attendant at station B that he has his valve properly set, and will notify the attendant at the central station that a consumption station wants fuel and which station it is. The valve 80 at station B is held in its shifted position by the catch 105.

The central station attendant will then shift valve 43 so as to admit air under pressure from tank 41 to pipes 45 and 47, thus starting the delivery of fuel. No more attention need be given by either attendant to the transaction except for the central station attendant to weigh the hopper 29, after hopper 35 has been filled, and to record the amount of fuel which was delivered to station B. Valve 43 will be latched in its open position, and contacts 224 and 226 will thus be closed, but solenoid 204 will not thus be energized since the circuit therethrough is now opened at contacts 101 and 103, at station B. When the hopper 35 is filled, the contacts 129 and 130 of the fuel level circuit closer on that hopper will be closed, thus closing a circuit from line wire 211, wire 210, contacts 104, 102, closed by the shifting of valve 80, wire 215, solenoid 108, wire 216, contacts 129, 130, wire 221 to line wire 208. The resulting energizing of solenoid 108 will release the catch 105, and valve 80 will be returned to normal by influence of weight 93, thus closing conduit 33 and opening conduit 31. Contacts 101 and 103 will also be thus closed again, thereby completing a circuit from line wire 208, wire 227, contacts 226 and 224 closed by opening of valve 43, wire 223, solenoid 204, wire 228, contacts 101, 103, at station A, wire 229, contacts 101 and 103 at station B, wire 230, contacts 103, 101 and 104, via wire 231 at station C to line wire 211. Solenoid 204 will thus be energized, releasing the arm 225 of valve 43 by its catch similar to catch 105 at valves 80, thus allowing valve 43 to be closed under the influence of its counterweight. The return to normal of valve 80 at station B will have extinguished signal lamp 201 and each of lamps 203.

In the event that the attendant at station B did not desire to have his hopper filled, he could operate his circuit closer 222, closing the circuit through solenoid 108 momentarily, thus stopping the supply of fuel and returning the system to normal at any desired stage. The valve 43 cannot be latched and left open when none of the valves 80 are shifted to fuel-receiving position, since at such times there is always a path for current to energize solenoid 204, which will not allow the catch 105 at valve 43 to act.

Many changes may be made in the physical embodiment of the invention without departing from its spirit.

I claim as my invention—

1. A powdered material distribution system comprising, in combination, a central supply station, a plurality of remote consumption stations, air blast means for conveying powdered material from said central station to a desired one of said consumption stations, and means operated by the powdered material in such consumption station for stopping at the central station the transmission of powdered material when the desired amount has been received at that consumption station.

2. A powdered material distribution system comprising, in combination, a central supply station, a plurality of remote consumption stations, air blast means for conveying powdered material from said central station to a desired one of said consumption stations, a valve at the central station for stopping the transmission of powdered material and means operated by the powdered material at the consumption station closing said valve when the desired amount of powdered material has been received at that station.

3. A powdered material distribution system comprising, in combination, a central supply station, a plurality of remote consumption stations, air blast means for conveying powdered material from said central station to a desired one of said consumption stations, a valve at the central station for stopping the transmission of powdered material, and electro-magnetic means operated by the powdered material at the consumption station closing said valve when the desired amount of powdered material has been received at that station.

4. A powdered material distribution system comprising, in combination, a central supply station, a plurality of remote storage bins, a single means for conveying material from said station selectively to each of said bins, means supplying forcing means to the central supply station to force the transmission of material, means for stopping the action of said forcing means and means at each bin, controlled by the level of material in said bin, adapted to operate said stopping means, when the material in that particular bin reaches a predetermined height.

5. A powdered material distribution system comprising, in combination, a central supply station, a plurality of remote storage bins, a single means for conveying material from said station selectively to each of said bins, a valve for stopping the transmission of material, and means at each bin, controlled by the level of material in said bin, adapted to operate said valve when the material in that particular bin reaches a predetermined height.

6. A powdered material distribution system comprising, in combination, a central supply station, a plurality of remote storage bins, a single means for conveying powdered material from said station selectively to each of said bins, means in said single conveying means for stopping the transmission of powdered material, and means at each bin, controlled by the level of powdered material in said bin, adapted to electro-mechanically operate said stopping means, when the powdered material in that particular bin reaches a predetermined height.

7. A powdered material distribution system comprising, in combination, a central station, a plurality of storage bins, means for conveying material from the central station to a desired one of said bins, means at the central station to set said conveying means into action, means adjacent each bin to condition the system to deliver material to that bin, means at each bin actuated automatically by the material in the bin as it reaches a predetermined amount simultaneously to cause said conditioning means to be restored to normal and the conveying means to cease acting.

8. A distributing system comprising, in combination, a feed chamber, an air chamber in said feed chamber having a plurality of forwardly directed jet openings in its walls, a moisture-separating chamber adapted to deliver air to said air chamber, means to deliver air under pressure to said moisture-separating chamber, and means to deliver powdered fuel to said feed chamber.

9. A distributing system comprising, in combination, a feed chamber, an air chamber in said feed chamber having forwardly directed jet openings in its walls, a conduit, a reducing connection between the feed chamber and conduit, an air pipe extending from said air chamber into said connection adapted to deliver air thereto, means to deliver air under pressure to said air chamber, and means to supply powdered fuel to said feed chamber.

10. A distributing system comprising, in combination, a feed chamber, a plurality of air jet chambers connected in series and located in said feed chamber, each jet chamber comprising a forwardly and upwardly sloping wall and a forwardly and downwardly sloping wall having jet openings therein, and means to supply powdered fuel to said chamber.

11. In a powdered fuel distributing system, a relatively large tank containing material to be distributed, an elongated injector adjacent to the tank having a discharge port, an intake port for motive fluid and a port receiving fuel from said tank, means for supplying compressed motive fluid to said intake of the injector, means including a plurality of ports distributed along the length of the inside of the injector, directed toward its discharge port, controlling the distribution of motive fluid in the injector, and means supplying compressed motive fluid in the tank behind the material therein to force the material toward the injector.

12. In a powdered fuel distributing system, a relatively large tank containing material to be distributed, an elongated injector below, adjacent to the tank having a discharge port, an intake port for motive fluid and a side port receiving fuel from said tank, means for supplying compressed motive fluid to said intake of the injector, means including a plurality of ports distributed along the length of the inside of the injector, directed toward its discharge port, controlling the distribution of motive fluid in the injector, and means supplying compressed motive fluid in the tank behind the material therein to force the material toward the injector.

13. An injector comprising an elongated case with a discharge port adjacent one end, a material to be delivered intake port at one side and a means for supplying motive material inside the injector, the same including a plurality of ports distributed at intervals along the entire internal length of the injector and pointed toward the discharge port.

14. In a pulverized coal transport system, the combination of a receiving bin, a blowing tank, a conduit extending from said blowing tank to said receiving bin, a valve in said conduit, blowing means for causing a flow of coal from said blowing tank into said conduit, automatically controlled means responsive to the quantity of coal in said receiving bin for controlling said valve, and automatically controlled means responsive to the position of said valve for controlling the operation of said blowing means.

15. In a pulverized coal transport system, the combination of a receiving bin, a blowing tank, a conduit extending between said blowing tank and receiving bin, blowing means for causing a flow of coal from said blowing tank to said receiving bin, a shunting valve in said conduit, and means controlled by the position of said valve for controlling the operation of said blowing means.

AUBREY J. GRINDLE.